United States Patent [19]

Hundebol

[11] E Patent Number: Re. 32,575

[45] Reissued Date of Patent: Jan. 12, 1988

[54] HAND GRINDER AND VALVE THEREFORE

[75] Inventor: Keld O. Hundebol, Ansager, Denmark

[73] Assignee: HH Patent ApS, Ansager, Denmark

[21] Appl. No.: 893,389

[22] Filed: Aug. 5, 1986

Related U.S. Patent Documents

Reissue of:

[64] Patent No.: 4,580,369
Issued: Apr. 8, 1986
Appl. No.: 467,668
Filed: Feb. 18, 1983

[30] Foreign Application Priority Data

Dec. 16, 1982 [DK] Denmark ..... 5575/82

[51] Int. Cl.[4] ..... B24B 23/00; B24B 55/00; F16P 3/22

[52] U.S. Cl. ..... 51/170 R; 251/252

[58] Field of Search ..... 51/170 R, 134.5 F, 170 PT; 251/252

[56] References Cited

U.S. PATENT DOCUMENTS

| | | | |
|---|---|---|---|
| 674,971 | 5/1901 | Kinman | 251/252 |
| 841,322 | 1/1907 | Hoxie | 251/252 |
| 903,451 | 10/1908 | Clark . | |
| 904,134 | 11/1908 | Kilbourn . | |
| 1,298,007 | 3/1919 | Cheney | 251/252 |
| 1,356,580 | 10/1920 | Witman | 251/252 |
| 2,125,554 | 8/1938 | Frank . | |
| 2,192,459 | 3/1940 | Taylor | 51/134.5 F |
| 2,326,396 | 8/1943 | Shaeoller | 51/134.5 F |
| 2,548,923 | 4/1951 | Walters et al. | 51/134.5 F |

*Primary Examiner*—Roscoe V. Parker
*Attorney, Agent, or Firm*—Ladas & Parry

[57] ABSTRACT

To be able to control the admission of compressed air or liquid to a machine in a hand tool, the working medium can be admitted to the machine through a handle with a built-in valve. By turning the handle (1) the valve opens or closes. The valve body itself (7,9) is secured to a stay in the form of a bolt (10) and a pipe (8) screwed into the bottom of the handle casing (1), whereas the valve seat (14) is formed as a recess in a bushing (2) being stationary relative to the casing. The handle has an oblique track (4) wherein a bolt (3) secured in the bushing moves the casing (1) and thereby the valve body relative to the bushing (2) when the handle is turned. When the handle is released in the open position of the valve (FIG. 3), the pressure exerted by the medium will move the casing so as to close the valve since the area of the casing is larger than that of the bush (2). The machine can thereby be safely and reliably disconnected by releasing the hold on the handle. The valve can be used for a hand grinder with a U-shaped handle pipe with handle ends and a hollow spindle situated between the handle ends, an air machine being arranged in the spindle. The spindle has a number of slotted grinding discs, and a pressure medium is admitted to the machine through passages in the handle pipe. A simple and reliable hand grinder which can efficiently grind deep profiles is thereby obtained.

11 Claims, 5 Drawing Figures

HAND GRINDER AND VALVE THEREFORE

Figure 1:
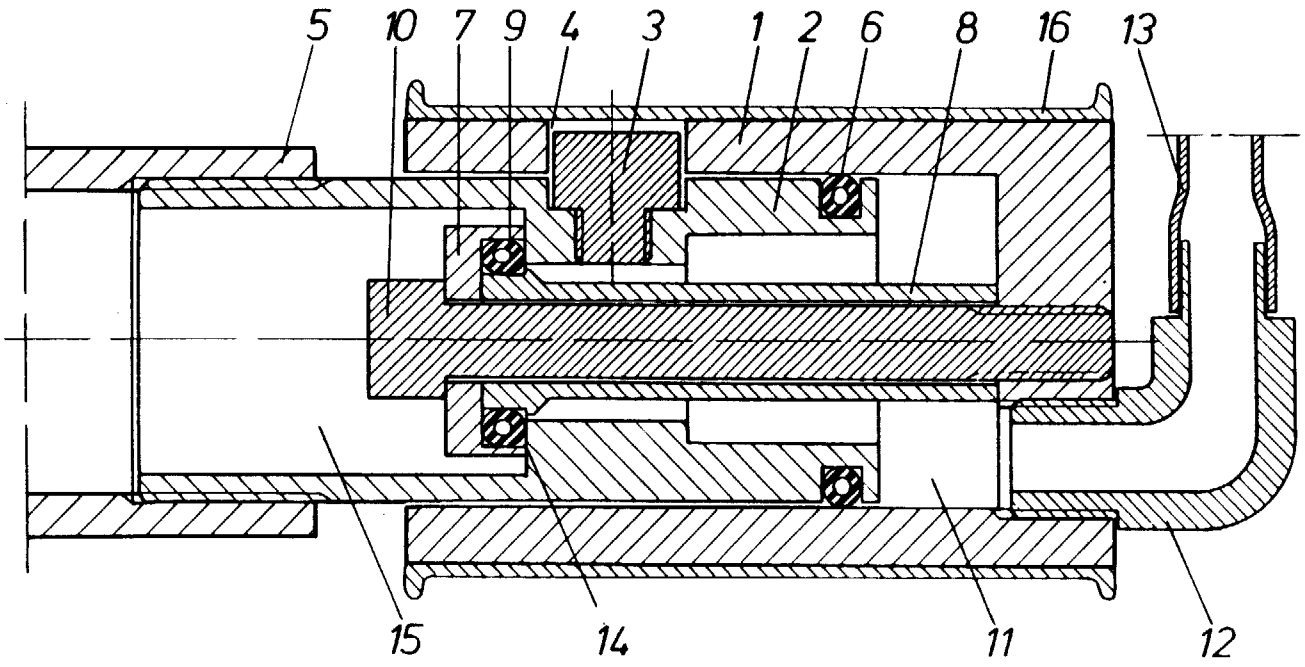

Matter enclosed in heavy brackets [ ] appears in the original patent but forms no part of this reissue specification; matter printed in italics indicates the additions made by reissue.

*This is a reissue application of U.S. Ser. No. 06/467,668 filed Feb. 18, 1983, U.S. Pat. No. 4,580,369 granted Feb. 18, 1983.*

The invention relates to a valve comprising a displacable valve body which can abut a valve seat and limit the flow of a medium.

Valves of this type are used for regulating and controlling working mediums in the form of compressed air and liquids utilized in air and hydraulic machines, respectively, of various types.

The invention furthermore relates to a hand grinder comprising a valve as mentioned above.

Such grinders must be operated in a suitable and safe manner and therefore it must be possible for the user to adjust the valve in a convenient way dependent of the situation of use in question.

In case of hand tools, the machine must therefore be manually adjustable and preferably without impairing the control of the tool so that damages may be incurred on tools and/or work.

In practice there are special problems in connection with large and heavy hand tools making such heavy demands on a secure grip that it is difficult to control the flow of the working medium through the valve without impairing the control of the tool. This means that the tool must be removed from the place of work, ie. be made non-machining, if a change of the speed of rotation of the machine is to be adjusted by the valve, before the tool can be made to machine again by bringing it nearer to the place of work.

It is the object of the present invention to facilitate the operation and thereby increase work safety and to improve tool precision, and this is achieved by means of a valve comprising a valve casing closed at one end and having an inlet for the medium at said end, and where on the inner side from said end there is extending a stem provided with a valve body, said body facing the end of the casing and cooperating with a valve seat designed as a recess in a bushing wherein the stem can be axially displaced.

There is thus obtained a valve which can be designed in a handle forming one of the holding positions on a tool so that the medium can be admitted to the rear of the handle at the closed end of the casing, e.g. through a hose, and through the valve to the opening in the bushing and then, e.g. through a pipe, to the working machine. From there the medium can be admitted through a second handle, if any, which can likewise be provided with a handle. In this manner, the pipe can form part of the tool equipment so that the control and regulating functions can be effected by means of one of the handles with a built-in regulating valve. The operation of the valve takes place by an axial movement of the valve casing.

By designing the valve casing the valve becomes self-closing without any use of auxiliary springs so that the pressure exerted by the medium will close the valve. This gives a high degree of operating comfort and at the same time great security of the valve being closed when the operator's hold of the handle is released.

By making the casing rotatable, the valve can be produced by such simple operations as boring and turning.

By providing the casing with an inclined track and letting a pin move in this track and thereby displace the casing relative to the bushing, the regulating can take place by a small turn of the casing.

By designing the valve, it can be constructed by simple components which are partly cheaply produced and partly easily replaced.

As disclosed, it is suitable to secure the bushing to an integrated part of the tool, thereby making it possible to use the handle for regulating as well as controlling the tool without the operator having to remove his hands from the handle.

The invention also relates to a hand grinder which can use the valve according to the invention.

By designing a hand grinder as disclosed, there is obtained a very efficient and safe hand grinder. By carrying the pressure medium to and from the machine within the handle pipe, there is obtained a high degree of security against breakages, and by designing the handle pipe with handles at the ends, the operator will keep in close contact with the grinder which will furthermore be of a very simple construction.

By letting the axis of rotation of the spindle be parallel to the longitudinal axes of the handles, there is obtained a convenient working position for the user. When using the grinder in such a way that the ends of the handles turn downwards, the grinder can be safely carried over vertical surfaces or the like.

By building the machine into the spindle, the best possible use of the space between the handles is made, just as the machine is well protected against dirt.

A grinder according to the invention can suitably be provided with a safety guard. The user is thereby given a high degree of safety in that the entire rear of the grinder is fenced.

By the grinding means disclosed comprising an assembly of a plurality of slotted discs, an efficient hand grinder is obtained, where the disc slats can efficiently grind even very irregular surfaces. Moreover, it is easy to replace the slotted disc assembly since it need only be provided with new grinding discs between the retaining discs. The whole assembly is simply secured by a screw at the end of the spindle. Such grinding discs are mentioned in the applicant's U.S. patent application Ser. No. 395,001 now U.S. Pat. No. 4,518,452.

Figure 2:
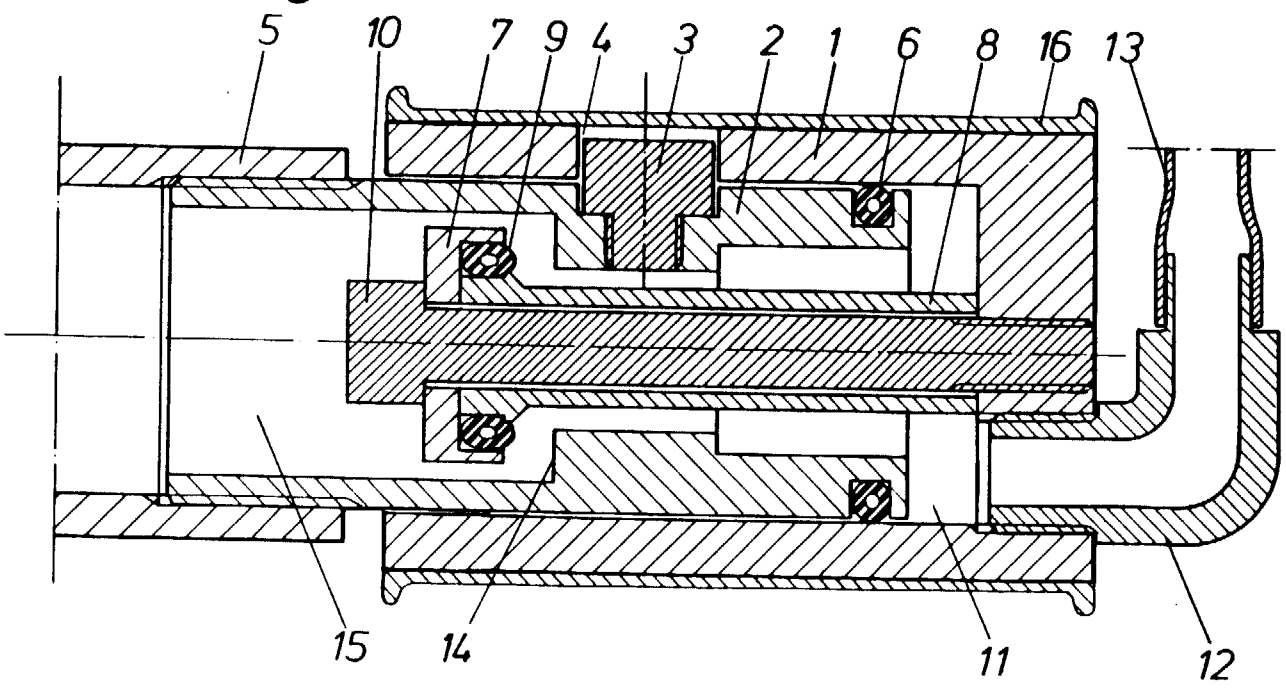
Figure 3:
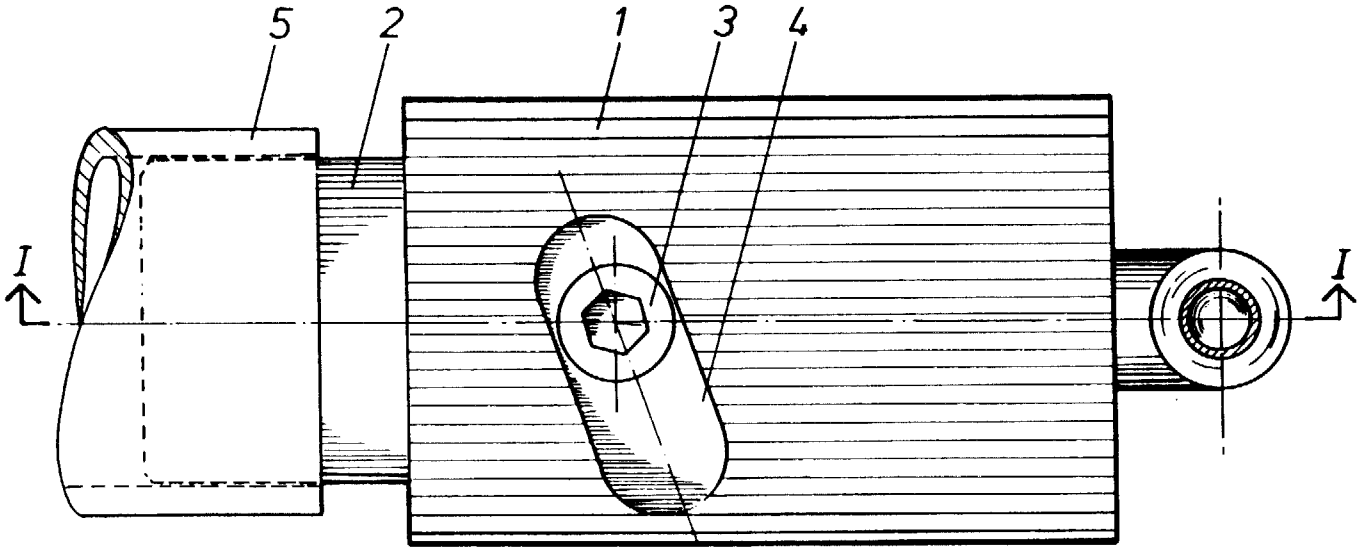

The invention will be further described in the following with reference to the drawing, wherein FIG. 1 is a sectional view of the valve in its closed position along the line I—I in FIG. 3, FIG. 2 is the same valve, but in its open position, FIG. 3 is a perspective view of the valve, FIG. 4 is a sectional view of the hand grinder shown in FIG. 5 in the direction of the arrows along the line IV—IV in FIG. 5, and FIG. 5 is a top view of a hand grinder according to FIG. 4.

The drawing shows an embodiment of the invention wherein the valve forms part of the control handle or the guide 5 of a machine-driven grinder. The grinder is provided with a guide, one end of which is shown in the drawing as the pipe 5 being the end of the right or left part of the guide.

The working medium in the form of compressed air or liquid is admitted to the machine through a hose 13 connected to the valve by a hose coupling 12 which can be of any suitable type.

The valve itself comprises a casing 1 which is rotatable about the longitudinal axis and which on the outside can be covered with rubber 16 to improve comfort and to ensure a firm grip.

The casing 1 is closed at one end so that an intake chamber 11 is formed at the coupling 12. A bolt 10 retaining partly a dished ring part 7 and partly a spacing pipe 8 retaining the ring part 7 at a given distance from the end of the casing is screwed into the end wall of the casing.

Moreover, an oblique through-going track 4, see especially FIG. 3, is arranged in the casing. In this track it is possible to displace a bolt head 3 so that a turn of the casing gives an axial movement thereof relative to a stationary bushing 2.

This bushing has been inserted in the casing so as to extend a suitable distance into the casing and at the end being provided with a circumferential groove wherein a packing 6 is arranged providing a seal between bushing and casing.

At some distance therefrom the bushing is provided with a recess forming on its outwardly extending surface extending at right angles to the axis a seat 14 in the valve. The bolt 3 securing the casing in its position is moreover screwed into this recess.

Finally, at its outwardly extending end the bushing 2 is provided with an external thread which can be screwed into the pipe 5 and through which the working medium is admitted when operating.

As appears from the drawing, the valve is assembled with a packing 9 between the ring 7 and the pipe 8 so that in the position shown in FIG. 1 the valve has completely cut off the working medium to the machine.

By turning the handle 16 towards the position shown in FIG. 2, the casing is moved towards the left and thereby the valve body 7,8,9 away from the seat 14. This makes it possible for the medium to pass through the valve. The passage is continuously variable from a closed position to maximum whereby it is possible to precisely control the admission of working medium to the machine.

When releasing the handle, the casing on account of the pressure of the working medium on the end surface being larger than the end area of the bushing will move the casing to the right and thereby the valve body towards the valve seat and so closing the valve. The valve is therefore a self-closing valve which is totally independent of compression springs or the like.

This renders a very high degree of security in that the machine will automatically and quite reliably cut off admission of pressure medium to the machine which will therefore stop. In case of a fall or some other accident, the valve will close automatically and thereby stop the machine.

To sum up it may be established that this simple and reliable valve renders a continuously variable control of the machine power at the same time as full control of the tool operation is maintained. Furthermore, there is the abovementioned security of an immediate stop of the machine in case the hold on the handle should cease.

FIGS. 4 and 5 show a hand grinder according to the invention. The hand grinder is provided with a handle pipe 17 being substantially U-shaped. In FIG. 5 the handle pipe 17 is shown with a bend so that the handles 25,26 are situated closer to the user than the center of the grinder. This to a high degree facilitates the operator's use on the machine. In each end the handle pipe is provided with handles 25, 26, and the handle pipe 17 is moreover provided with an inlet passage 18 and an outlet passage 19. In case the handle pipe is assembled from two lengths of pipe, the passages 18, 19 should mearly be the inside diameter of the pipe.

In the handle 25 there is arranged a valve 21 according to the invention, said valve having an inlet nozzle 22 being suitably provided with a snap action coupling for a pressure hose. In the handle 26 the outet passage 19 ends with an outlet opening 23. This can e.g. be provided with a filter 24 or a sound-absorbing device just as the outlet opening 23 can be connected to a return hose for hydraulic liquid.

In connection with the inlet passage 18 and the outlet passage 19 the machine 20 is arranged within a hollow spindle 27. This can suitably be driven by compressed air, but a hydraulic machine or motor can also be used.

The machine 20 is controlled by the valve 21, said machine making the spindle 27 rotate. A number of grinding discs 28 are secured to the spindle by means of retaining discs 31. These grinding discs can suitably consist of sand paper or emery cloth, but other materials are available. The discs 28 are slotted so that they comprise a plurality of slats. These slats can be made double so that both sides are grinding.

Other types of grinding means are possible however. The spindle can be covered with wool or the like for polishing purposes.

When the grinding means as shown in the drawing rotates, it is possible to grind even highly irregular or difficult work pieces, because the slats will go into even very deep profiles and grind efficiently. This makes the hand grinder according to the invention very efficient for e.g. an intermediate grinding of varnished work pieces such as furniture.

The hand grinder is moreover provided with a safety guard 30. This is dome-shaped so as to encircle the part of the grinding means facing the user. The safety guard 30 is suitably made from a light and strong plastic material. The safety guard can be designed in a great number of other ways so that they can be semicircular or quadrangular.

The handle pipe 17 can conveniently be made of aluminium. It is very important to reduce the weight of the grinder so as to avoid the user becoming tired. Due to its compactness and the possibility of using light materials, the grinder can be made very light.

The grinding discs 28 are secured to the spindle 27 between retaining discs 31. These are tightened between a removable flange 33 and a fixed flange 32 by means of a center screw 29. When the grinding discs 28 are worn out, they can therefore be replaced. The retaining discs 31 are provided with a center opening fitting into the spindle 27. This can e.g. be provided with a longitudinal toothing for securing the grinding discs being tightedly fixed or in some other manner retained between the retaining discs 31.

The invention according to the application is not limited to the embodiment shown in the drawing. A hand grinder according to the application can be designed in many different ways within the scope of the invention such as these appear from the annexed patent claims.

I claim:

1. Hand grinder, characterized in that the hand grinder comprises a substantially U-shaped handle pipe (17) having an inlet and an outlet passage (18,19) for a pressure medium used for operating a motor (20), said inlet passage (18) being adapted to supply the pressure medium from a valve (21) to the machine (20), said outlet passage (19) being adapted to carry the pressure medium from the motor (20) to an outlet opening (23) on the handle pipe (17) the ends thereof being designed as handles (25,26), said valve (21) being mounted in one of the handles (25) of the handle pipe (17), and that the motor (20) drives a rotating spindle (27) having a grinding means.

2. Hand grinder according to claim 1, characterized in that the axis of rotation of the spindle (27) is substantially parallel to the longitudinal axes of the handles (25,26).

3. Hand grinder according to claims 1, characterized in that the spindle (27) is hollow, and that the motor (20) is built into the spindle (27).

4. Hand grinder according to claims 1, characterized in that the hand grinder is provided with a safety guard (30) secured to a connecting part of the handle pipe (17), said guard (30) covering at least the rear part of the grinding means.

5. Hand grinder according to claims 1, characterized in that the grinding means (28) comprises a plurality of circular slotted grinding discs (28) fixed co-axially around a spindle and secured by retaining discs (31).

6. A valve comprising a displaceable valve body which can abut a valve seat and limit the flow of a medium, a valve casing (1) closed at one end and having an inlet for the medium at said end, a stem (8, 10) extending from the closed end of the casing end being provided with the valve body (5, 9) at the free end, a bushing having one end movably mounted in the open end of the casing receiving the stem for axial displacement therein, and a recess formed in the other end of the bushing to define the valve seat whereby said valve body faces the end of the casing and co-operates with the valve seat.

7. Valve according to claim 6, characterized in that the casing (1) has an inner end surface which is larger than an area formed by the bushing (2) opposite the end surface of the casing.

8. Valve according to claim 6, characterized in that said casing (1) is rotatable about the bush (2).

9. Valve according to claims 8, characterized in that the casing (1) is provided with a track (4) forming an angle with the axis of rotation of the casing, and that a pin (3) secured to the bush (2) moves in the track.

10. Valve according to claim 6, characterized in that the stem comprises a bolt (10) having a head and being screwed into the end of the casing, and retaining behind said head a ring (7) with a packing (9) and a spacing pipe (8).

11. Valve according to claims 6, characterized in that the bush (2) at an end facing away from the end of the casing (1) is secured to an admission hose or pipe (5) for said medium in the bush.

* * * * *